Feb. 22, 1966     C. W. HIGHBERG     3,236,009
APPARATUS FOR SURFACING
Original Filed June 26, 1961     4 Sheets-Sheet 1
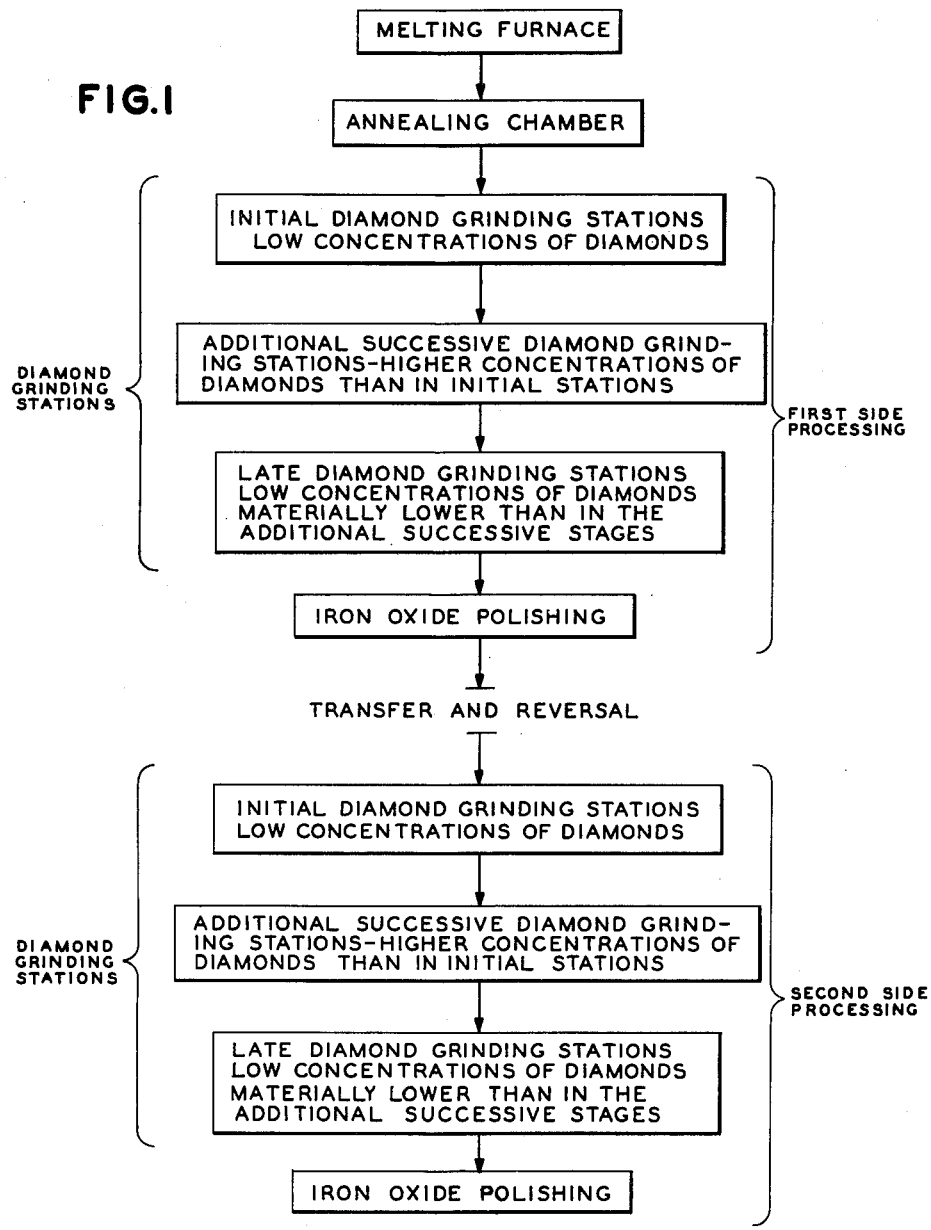
INVENTOR.
CARLE W. HIGHBERG
BY
ATTORNEY

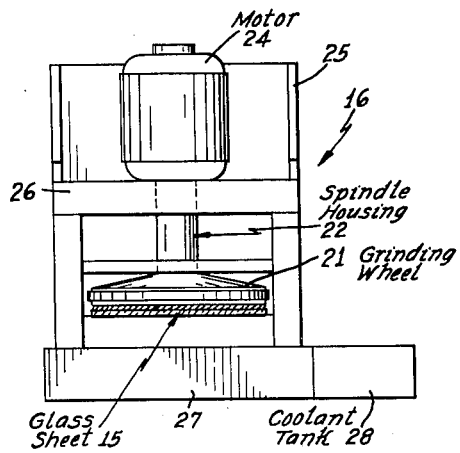
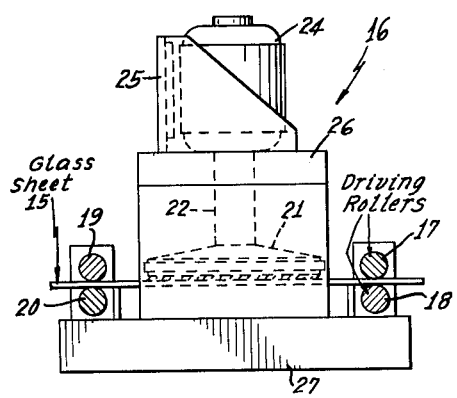
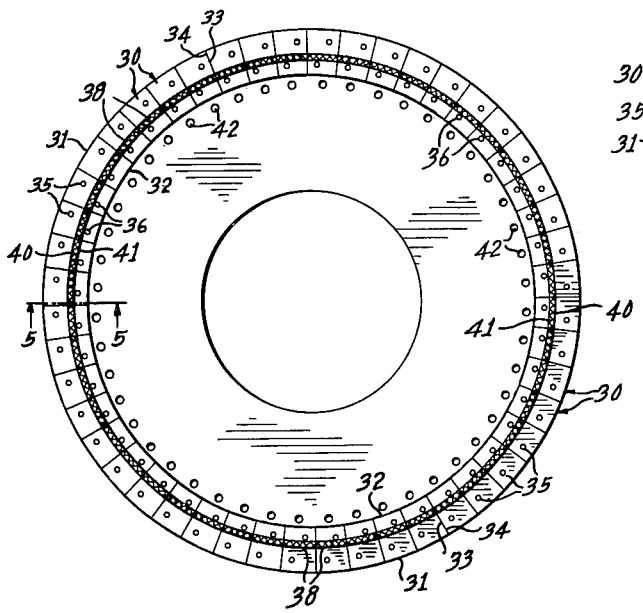
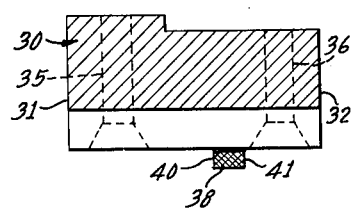

Feb. 22, 1966  C. W. HIGHBERG  3,236,009
APPARATUS FOR SURFACING
Original Filed June 26, 1961  4 Sheets-Sheet 3

DIRECTION OF WHEEL ROTATION

DIRECTION OF WHEEL ROTATION

DIRECTION OF WHEEL ROTATION

DIRECTION OF WHEEL ROTATION

*INVENTOR.*
CARLE W. HIGHBERG
BY
Brumbaugh, Free, Graves & Donohue
ATTORNEY

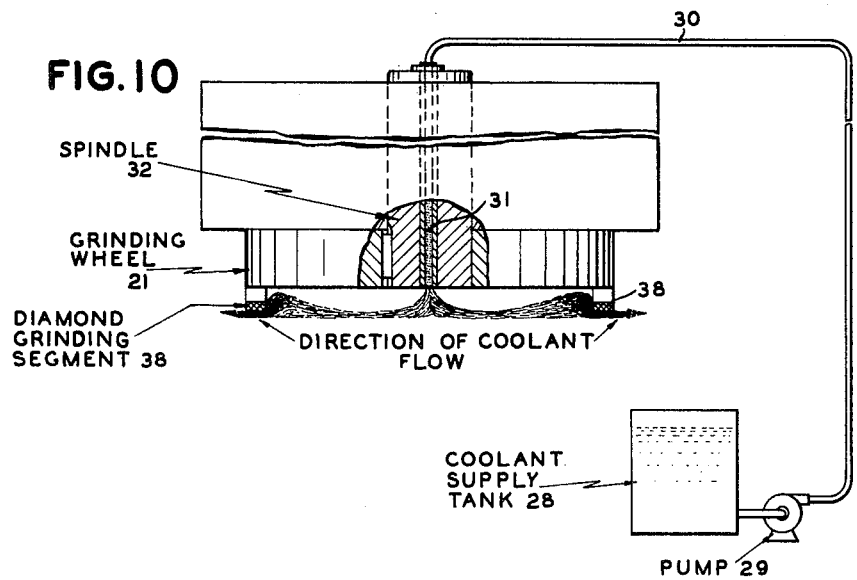
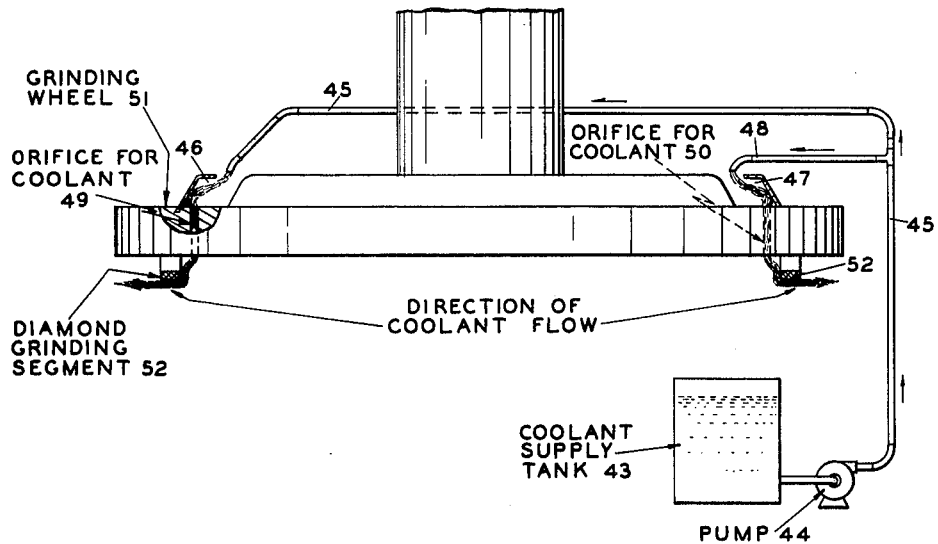

United States Patent Office 3,236,009
Patented Feb. 22, 1966

3,236,009
APPARATUS FOR SURFACING
Carle W. Highberg, Murray Hill, N.J., assignor to Engelhard Hanovia, Inc., Newark, N.J., a corporation of New Jersey
Original application June 26, 1961, Ser. No. 119,444, now Patent No. 3,177,628, dated Apr. 13, 1965. Divided and this application Apr. 8, 1965, Ser. No. 446,502
8 Claims. (Cl. 51—110)

This application is a division of my copending application Serial No. 119,444, filed June 26, 1961, now Patent No. 3,177,628, dated April 13, 1965.

This invention relates in general to the grinding of materials with hard abrasives, and, more particularly, to a new and improved apparatus for grinding and/or honing of surfaces or edges of materials such as, for instance, glass, stone and ceramics.

As is developed hereinafter, the studies which led to the broad concepts of the present invention have been generally carried out on the special application of grinding glass with diamond grinding wheels. However, it it to be understood that the principles of this invention are not restricted to only diamond grinding of glass but are equally applicable to the grinding of various other materials, for instance, stone, e.g. marble, granite, etc.; and ceramics, e.g. silicon carbide (Carborundum), aluminum oxide, etc., employing hard abrasives other than diamonds, for instance cubic boron nitride.

In the prior art manufacture of plate glass, the plate glass is continuously extruded from the melting furnace, followed by passage through an annealing chamber. From the annealing chamber, the plate glass is subjected to grinding and polishing, typically involving passage first through twenty-eight successive beach sand grinding stations. The grinding operation is carried out at each of these stations by large grinding heads having vertically mounted spindles, which have horizontal grinding surfaces extending across the width of the plate glass. After the grinding at such beach sand stations, additional polishing is required, typically at forty-two additional stations, wherein the polishing heads also have vertical spindles, and iron oxide or rouge is employed as abrasive. This prior art process for grinding plate glass is disadvantageous for the reasons that a large amount of expensive machinery and floor space is required, and the facilities and manpower required for handling the bulky abrasives are very costly.

In my copending application Serial No. 124,844, filed July 18, 1961, a considerable improvement in the grinding and polishing of glass is provided by the replacement of the first two-thirds or more of such seventy stations of grinding and polishing with a lesser number, such as 15 or less stations of diamond grinding. This large reduction in the number of grinding stations required was achieved by the use of diamond grits or particles in the surface portion of the grinding heads instead of the beach sand. This method is a considerable improvement for the reasons that the amount of floor space, machinery and manpower required in the processing of the plate glass is considerably reduced, with resulting reduced cost of the entire operation. In this improvement method, the diamond concentration in terms of carats per cubic inch of grinding wheel matrix is relatively low in the initial stations of rough grinding and is increased in the additional successive grinding stages and later stages with a corresponding reduction in diamond particle size, the diamond concentrations being the largest or highest in the late stages.

It has now been found that a further improvement in the grinding of glass is achieved, characterized by a striking economy in the quantity of diamonds required and a considerable reduction in overall costs, by a method involving diamond grinding the glass in the initial stations with diamond wheels having a low concentration of diamonds of a predetermined grit size, diamond grinding the glass in additional successive stations with wheels having higher concentrations of smaller grit size diamonds than in the initial stations, and diamond grinding the glass in late stations of the method with wheels having low diamond concentrations materially lower than those of the wheels of the additional successive stations and which can also be materially lower than the diamond concentrations of the wheels of the initial stations, the diamond grits of the wheels of the late stations being of still smaller grit size. In addition to the striking economy in diamond requirements and in overall costs, the method achieves the following improvements: considerable improvement in wheel life, i.e. the life of the grinding wheel is considerably prolonged; reduction in glass breakage and minimization of the possibility of damage and breakage to the glass; obtainment of grinding results that are predictable and can be duplicated; and improved performance of cutting wheel.

Use of the grinding wheels in the late stations having diamond concentrations materially lower than those of the wheels of the additional successive stations with good results is directly contra to what was previously believed, the wheels of the late stations of the previous diamond grinding method having considerably larger diamond concentrations in carats per cubic inch than those of the wheels of the intermediate or additional successive stations. It was unexpected and surprising to find that the use of the wheels having the lower diamond concentrations in the late stations gave improved results. Apparently, the reason for this, as is discussed hereinafter, is that at all of the stages in the diamond grinding there is an optimum pressure for each diamond particle, decreasing with decrease in the average particle size (increase in grit size number).

In a preferred embodiment, the grinding wheel is segmented with the grinding segments being arranged therein in a generally circular arrangement preferably adjacent the peripheral edge portion of the wheel support. The grinding segments each comprise a matrix having diamond grits bonded therein. The grinding segments may be arranged on the wheel support in a continuous narrow circular arrangement with minimum spacing between neighboring segment edge portions. By reason of this circular arrangement of the segments on the wheel support, a considerably prolonged life of the wheel is achieved. It is believed that the primary reason for this prolonged wheel life is that the circular arrangement of the grinding segments makes possible the largest possible number of diamond grits for a particular diamond concentration, at the leading and trailing cutting edges of the segment. Previously, when the segments were arranged in a non-circular arrangement and at angles to a tangent to the wheel, the grinding wheel did not have as long a life as was desired, the reason being that only a relatively few active grits were available for the grinding. This placed an undue strain and stress on the grits which resulted in too short a wheel life.

Coolant is employed for absorbing heat from the grinding surface, which improves the life of the grinding wheel, and this coolant is preferably delivered or supplied to the inner cutting edge of the wheel, such delivery of the coolant being of considerable importance to the performance of the diamond wheels. It was found that by reason of supplying the coolant to the inner cutting edge of the wheel, the coolant is most efficiently utilized in contrast to delivery of the coolant to the outer cutting edge of the wheel which gives less efficient use of the coolant. By the interior delivery of the coolant, centrifugal force causes it to contact all the exposed diamond grit surface, provided the segments are placed with minimum spaces between them. However, particularly with large grinding wheels, it may be useful also to apply coolant to the outer cutting edges. The coolant can be supplied to the inner cutting edge of the wheel by means of a hollow shaft spindle, or with larger wheels preferably by flowing down the inner edges of the grinding segments through suitably disposed orifices or holes in the diamond wheel. The coolant is an oil in water emulsion type and preferably comprises, by volume, from about 20–100 parts of water per each one part of coolant concentrate (oil and emulsifier).

For use with the coolant, wheels having the diamond grits bonded thereto with metal are preferred. Among these metal bonded wheels, a copper-based alloy, i.e. an alloy containing a major proportion of copper is the preferred bonding material or matrix. In addition to the copper other metals advantageously present in the alloy of the bonding material or matrix include one or more of zinc, tin, silver, aluminum, beryllium, manganese and iron. Brasses and bronzes are particularly suitable. A typical analysis of one brass matrix well suited for use in the grinding wheels of this invention for bonding the diamond grits is the following:

| Element: | Percent by weight |
|---|---|
| Copper | 70 |
| Zinc | 30 |

A typical analysis of one bronze matrix well suited for use in bonding the diamond grits in the wheels is the following:

| Element: | Percent by weight |
|---|---|
| Copper | 80 |
| Tin | 20 |

The hard abrasives used for the grinding of this invention can be of any of those having a hardness number of at least 8, preferably at least 12 on the Extension of Mohs' Scale or Metal Equivalent columns in the following tabulation.

| Extension of Mohs' Scale | Metal Equivalent | Mohs' Scale |
|---|---|---|
| (6) Orthoclase or periclase. | | (6) Orthoclase. |
| (7) Vitreous pure silica | | |
| (8) Quartz | (8) Stellite | (7) Quartz. |
| (9) Topaz | | (8) Topaz. |
| (10) Garnet | | |
| (11) Fused zirconia | (11) Tantalum carbide | |
| (12) Fused alumina | (12) Tungsten carbide | (9) Sapphire. |
| (13) Silicon carbide | | |
| (14) Boron carbide | | |
| (15) Diamond | | |
| (15) Cubic boron nitride | | (10) Diamond. |

This tabulation is adapted from Ridgeway et al., Trans. Electrochem. Soc. 63, 369 (1933) by addition of cubic boron nitride at a number 15 hardness as equivalent to diamond. As set forth in the foregoing tabulation, materials having a hardness number of 8 and higher on the Extension of Mohs' Scale include quartz, topaz, garnet, fused zirconia, fused alumina, silicon carbide, boron carbide, diamond and cubic boron nitride. In the Metal Equivalent column, stellite has a hardness number of 8 which is equivalent to that of quartz, tantalum carbide has a hardness of 11 which is equivalent to that of fused zirconia, and tungsten carbide has a hardness of 12 which is equivalent to that of fused alumina or sapphire. It is known that cubic boron nitride will scratch diamond and that diamond will scratch cubic boron nitride, so that they are properly considered as equivalent in hardness.

The disclosures herein of preferred diamond concentrations for the grinding, and in particular surprisingly low diamond concentrations in late stages of grinding glass are not restricted to diamond grinding of glass. These surprising results are obtained also in the grinding of various other materials, for instance stone and ceramics, with other hard abrasives such as those enumerated above having a hardness of 8 or higher, preferably 12 or higher on the Extension of Mohs' Scale, preferably when the abrasive is used in a grinding wheel and a coolant is employed. Stone which can be ground in accordance with the present invention includes marble, granite, etc. and ceramics which can be ground include silicon carbide (Carborundum), aluminum oxide, etc.

In the drawings:

FIGURE 1 is a diagram representing an exemplary process of the present invention utilizing the diamond grinding of this invention, with low concentrations of diamonds being employed in the late grinding stations materially lower than those concentrations employed in the initial stations;

FIG. 2 is a side elevational view of a single diamond grinding station for use in the method and apparatus of the present invention;

FIG. 3 is also a side elevational view of a single grinding station for use in the method and apparatus of the present invention, the view also showing means for feeding the glass through the station;

FIG. 4 is a plan view of a plurality of segment holders mounted on the wheel support in juxtaposition to one another, the segments being so mounted on the segment holders as to form a continuous circular arrangement adjacent to the peripheral edge portion of the wheel;

FIG. 5 is a section taken on line 5—5 of FIG. 4;

Figure 6:
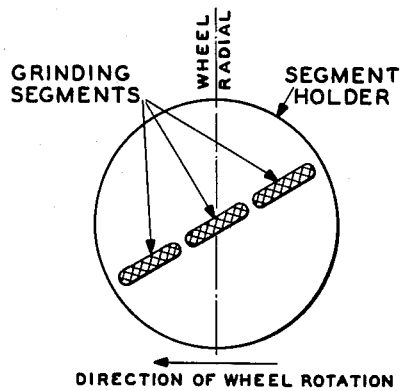
FIGS. 6, 7 and 8, represent arrangements of segments on segment holders of grinding wheels in accordance with previous methods for grinding glass.

FIG. 10 is an elevational section through the hollow shaft spindle of a small grinding wheel of the present invention, the coolant being supplied to the inner cutting edge of the wheel through the enclosed central passageway of the hollow spindle, this figure also showing the pump and conduit for supplying the coolant from the coolant supply tank to the hollow shaft spindle; and FIG. 11 is an elevational section through the spindle and grinding wheel of a larger grinding wheel of the invention and showing coolant-supply orifices or holes in the wheel support, these orifices communicating with a coolant-supply conduit leading from a coolant-supply tank, this figure also showing the coolant-supply tank and pump for supplying the coolant to the orifices and hence to the inner cutting edge of the wheel.

With reference to FIG. 1, in a specific embodiment, a sheet of plate glass, which is continuously extruded in the melting furnace, is passed through the annealing chamber in conventional and known manner. From the annealing chamber the glass sheet is passed successively to each of the initial diamond grinding stations, these initial grinding stations being typically three in number. Principal irregularities present in the surface of the glass are removed in these initial grinding stations.

Referring now to FIGS. 2 and 3, the sheet of plate glass 15 is fed through an initial grinding station 16 by driving rollers 17, 18, 19 and 20 shown in FIG. 3. Alternatively, the glass sheet may be blocked, clamped, or otherwise secured to a suitable supporting surface and fed with the supporting surface through the grinding stations. The grinding station 16 comprises a generally circular diamond grinding wheel 21 having a diameter greater than the width of the glass sheet 15. Grinding wheel 21 is mounted coaxially on a rotatable vertical spindle contained within bearing housing 22, wheel 21 being driven by motor 24 which is mounted above wheel 21 on supporting frame 25 made up of suitable supporting members. Grinding wheel 21 comprises a generally circular support and a plurality of grinding segments mounted on one side of the support in a generally circular arrangement adjacent the peripheral edge portion of the support as hereafter described. Supporting frame 25 is supported by main frame 26 of the grinding station, which also supports bearing housing 22 for the vertical spindle of grinding wheel 21. Base 27 of the grinding station provides a heavy rigid support for the entire apparatus. A suitable coolant tank 28 and associated coolant pump is provided for recirculating coolant to the working surface between the grinding wheel 21 and the plate glass 15. The coolant is preferably supplied or delivered to the inner cutting edge of the grinding wheels as previously discussed, for instance by means of a hollow spindle.

As shown in FIG. 10, the coolant is pumped from coolant supply tank 28 by means of pump 29 through conduit 30 into the central passageway 31 of hollow shaft spindle 32 for grinding wheel 21, passageway 31 extending along the axis of spindle 32 and communicating one end of the spindle with the opposite end thereof. By reason of the centrifugal force obtaining as a result of rotation of the wheel 21, the coolant flows in an outwardly direction as indicated by the arrows to the inner cutting edge and into contact with all of the exposed diamond grit surfaces and the surfaces of grinding segments 38. As shown in FIG. 11, with the larger grinding wheels, for instance wheels having diameter of 30" and larger, the coolant is pumped from coolant tank 43 by pump 44 through conduits 45 and 48 into ante-chambers 46 and 47 respectively, which communicate with a plurality of spaced holes or orifices 49 and 50 in the grinding wheel 51. The spaced orifices, which communicate one side of the wheel support with the opposite side thereof, are arranged in a generally circular arrangement adjacent and inwardly of the inner edge of the circular or generally circular arrangement of diamond segments and function to discharge the coolant to the inner edge of the grinding segments 52, whereby the centrifugal force resulting from rotation of wheel 51 causes the coolant to flow in an outwardly direction as indicated by the arrows to the inner cutting edge and into contact with all of the exposed diamond grit surfaces and the surfaces of grinding segments 52.

Referring now to FIG. 4 showing the continuous circular arrangement of the diamond grinding segments 38, segment holders 30 are mounted on the grinding wheel support which is a generally circular support. Segment holders 30 are plates having slightly curved outer and inner peripheral edge portions 31 and 32 respectively with lateral edge faces 33 and 34 tapering slightly inwardly from the outer to the inner edge. Bolts 35 and 36 are integral with the upper surface of segment holders 30 and have threaded outer end portions, these mounting bolts extending through registering orifices in the wheel support to mount the segment holders securely to the wheel support with the aid of nuts on their threaded end portions. Grinding segments 38 are secured to the lower surface or side of segment holders 30 by brazing to provide a diamond grinding plane extending generally perpendicular to the central axis of the support. As shown, segments 38 are secured to the segment holders one per segment holder. Spaced holes or orifices 42 function to discharge coolant to the inner edges of grinding segments 38.

In accordance with one important feature of the invention, grinding segments 38 are secured to segment holders 30 in such manner as to cooperate with one another to form a continuous or substantially continuous narrow circular grinding face or plane located adjacent the periphery of the wheel support. The width of each segment of this circular segment arrangement is typically about 0.250", and the circular arrangement of segments is spaced typically about 1" from the outer peripheral edge of the wheel support. The diamond grits or particles are dispersed in the matrix of each segment and as wear proceeds are successively exposed on the surface of the matrix. Diamond wheels for the grinding of glass are normally made with metal bonds, one typical bond comprising, by weight, approximately 70 percent copper and 30 percent zinc. Other bonds including copper and zinc and various combinations of the elements mentioned above are also satisfactory. Steel bonded wheels can also be employed. By reason of the continuous circular arrangement of the segments, a maximum number of diamond grits or particles is provided at the leading edge 40 and trailing edge 41 of the segments. A narrow spacing can be present between the segments, for instance a spacing of about ⅛", which is greater than the minimum or small spacing of not over 0.005 inch which may be present between contiguous segment holders.

This provision of a maximum number of available diamond grits at the leading and trailing cutting edges of the cutting base of the wheel is of the utmost importance, as it has been found that the life of the wheel is increased considerably with such an arrangement of segments. In the segment arrangement of FIGS. 6 and 7, the segments are not arranged in a circular arrangement on the wheel support but the segments are at an angle to the tangent to the wheel periphery. Accordingly, the number of active diamond grits or particles available in the leading and trailing edges of the wheel is considerably reduced in the segment arrangements of FIGS. 6 and 7. Consequently, the life of the wheel is materially shortened and falls off abruptly, which is due to the excessive pressures and stresses built up on the relatively few particles available at the leading and cutting edges of the segments. By the term "leading edge" of the wheel or segment is meant the first edge of the wheel cutting surface making contact with the moving glass, this first edge of the circular cutting surface of the wheel being the outer circumferential line of this cutting surface. By the term "trailing edge" of the segment or wheel is meant the first edge of the second half of the wheel cutting surface making contact with the moving glass, such first edge of the second half of the cutting surface being the inner circumferential line of the circular cutting surface. The following comparative data Table I evidences the striking improvement in wheel life attained by the present invention, the wheel life being expressed in terms of cubic inches of glass removed per carat of diamond. Data was obtained from the same wheels as those of FIGS. 6–9 and from an equivalent wheel as that of FIG. 4. All data were obtained under equivalent evaluation conditions.

TABLE I

Figure 7:
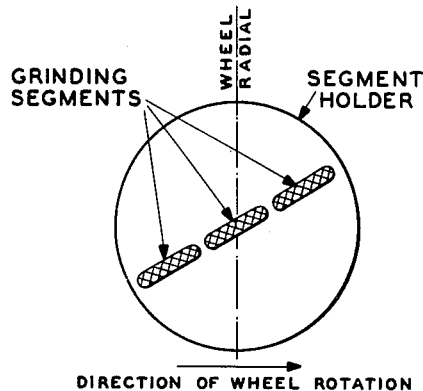
Figure 8:
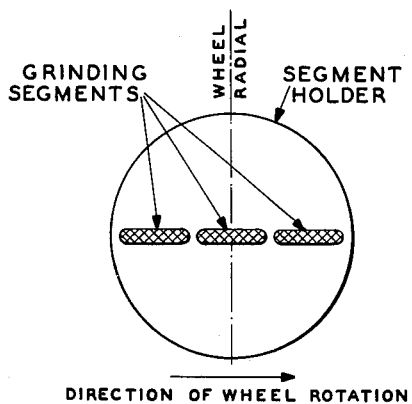
Figure 9:
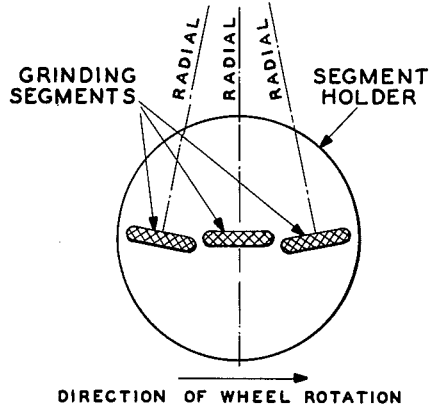
FIG. 9 is a view showing an exemplary arrangement of segments on a segment holder in accordance with the present invention, the segments being in a circular arrangement and narrowly spaced from each other when mounted on the grinding wheel.

| Segment arrangement | Wheel life, cu. in. of glass/carat | Surface finish (microinches) |
| --- | --- | --- |
| Fig. 4 | 1,562 | 215 |
| Fig. 9 | 853 | 270 |
| Fig. 8 | 580 | 225 |
| Fig. 6 | 313 | 260 |
| Fig. 7 | 213 | 220 |

It is readily apparent from Table I that the circular arrangement of grinding segments on the wheel support in accordance with FIG. 9, which is in accordance with the invention, gives a materially longer wheel life than is obtained using the non-circular segment arrangements of FIGS. 6, 7 and 8. Elimination of the spacing between the segments of FIG. 9 as in FIG. 4, or keeping the spacing between the segments to a minimum, achieves a still longer life of the grinding wheel.

The considerable improvement in wheel life achieved by this invention is also shown by comparative data in Table II set forth below, the wheel life again being expressed in terms of cubic inches of glass per carat of diamonds. In all cases in Table II a 30 inch outer diameter wheel was used (27 inch outer diameter of the grinding segments). Twenty inch by 60 inch glass specimens were moved reversibly in the long direction at a table speed of 200 inches per minute. Coolant concentration and flow rate were maintained constant during the periods of the tests.

grit size is preferably about the 50 to 60 grit size inasmuch as the larger grit sizes, say of the order of 20 to 30, tend to cause excessive chipping of the edges of the plate glass. Further, in these initial stations, typical operating conditions are a feed speed of about 200″ per minute of the glass relative to the grinding wheel, and a cut of about .004″. The grit size figures specified indicate that the diamond grits will pass through a screen of a certain mesh size but will not pass the screen of the next mesh size. Thus, for example, 50 to 60 grit diamonds will pass through a 50 mesh screen but will not pass through a 60 mesh screen. The basis for mesh sizes in the present specification is the U.S. Sieve Series.

Further, as shown in FIG. 1, as the sheet of plate glass advances from the initial grinding stations to additional successive grinding stations, where additional increments of stock are removed from the plate glass, the concentra-

TABLE II

| Test No. | Downfeed per table reversal (inches) | Segment arrangement, Fig.— | Spindle speed (r.p.m.) | Wheel life | | Surface finish (microinches) |
|---|---|---|---|---|---|---|
| | | | | Cu. in. of glass/ cu. in. of dia. mat. | Cu. in. of glass/ carat | |
| 3 | .004 | 6 | 370 | 2,820 | 313 | 220-300 |
| 4 | .002 | 6 | 370 | 7,820 | 870 | 210-260 |
| 5 | .002 | 7 | 370 | 4,815 | 535 | 250-300 |
| 6 | .004 | 7 | 370 | 1,918 | 213 | 200-240 |
| 7 | .002 | 8 | 370 | 10,784 | 1,198 | 200-250 |
| 8 | .004 | 8 | 370 | 5,223 | 580 | 200-250 |
| 9 | .002 | 9 | 370 | 9,724 | 1,080 | 200-250 |
| 10 | .002 | 9 | 370 | 9,572 | 1,064 | 200-240 |
| Ave. | | | | | 1,072 | |
| 11 | .004 | 9 | 370 | 7,786 | 865 | 240-300 |
| 12 | .004 | 9 | 370 | 7,565 | 841 | 240-300 |
| Ave. | | | | | 853 | |
| 13 | .002 | 9 | 665 | 10,552 | 1,172 | 140-180 |
| 14 | .004 | 9 | 665 | 8,902 | 989 | 180-250 |
| 15 | .002 | 9 | 665 | 8,734 | 970 | 190-240 |
| Ave. | | | | | 980 | |
| 16 | .002 | 9 | 1,025 | 10,020 | 1,113 | 200-250 |

As evidenced by Table II, the life of the grinding wheel is considerably longer in general, when employing the segments of the present invention as shown in FIG. 9, as contrasted with the non-circular arrangement of segments shown in FIGS. 6, 7 and 8.

Grinding segments 38, shown in FIG. 4, each have typical dimensions of length of about 1 13/16″, width of about 0.230″, and a depth or thickness of about 1/8″. The area of the grinding face of each segment 38 is typically about 0.415 square inch. Segment holders 30 each have typical dimensions of length of 1 13/16″ where segments are attached, width of 2 1/16″, and thickness of 5/16″.

In the initial grinding stations, the surface of the plate glass is roughly ground to remove the principal irregularities in the surface of the glass. As stated in FIG. 1, the diamond concentration, in terms of carats per cubic inch of wheel matrix, is relatively low in the initial stations, usually the first three stations. However, the diamond grit or mesh size should be relatively large in these initial stations. The expressions "grit size" and "mesh size" are used synonymously herein referring to particles or grits passing through sieves of the specified number of linear openings per inch. Recently sieves of good precision with openings smaller than 325 mesh have become available, and this invention includes in part the use of grits of such smaller size.

Specifically, diamond concentrations of less than 20, preferably about 9 carats per cubic inch of grinding segment matrix may be utilized for the initial stations. The tion of diamonds in carats per cubic inch of wheel matrix is increased, i.e. is higher in these additional successive stations than in the initial stations. Further, there is a corresponding reduction in size of the diamond particles and a reduction in the depth of the cuts. Diamond concentrations of about 20 carats and higher, preferably about 20 carats per cubic inch of grinding segment matrix, are employed in the wheels of the additional successive stations. The average grit size at these intermediate or additional successive stations is about 100–120 grit size. Typical operating conditions in these intermediate or additional successive stations, which are usually stations Nos. 4–7 of the present invention, are a feed speed of about 200″ per minute of glass relative to the grinding wheel, and a cut of about .002″.

As shown in FIG. 1, the glass sheet is then advanced to the later or late grinding stations, these late grinding stations usually being stations Nos. 8–14. It is found that employment of low concentrations of diamond grits in these later or late stations materially lower than employed in the additional successive stages, with the grits substantially uniformly dispersed and bonded in the grinding segment matrix, gives excellent grinding results with a striking economy in diamond requirements and a considerable reduction in surfacing costs. The use of these lower concentrations of diamond grits with good results in the late stations is directly contra to what was previously believed. Diamond concentrations which can be materially lower than 9 carats, preferably lower than 1 carat per cubic inch of grinding segment matrix, are employed in the wheels of these late stations. This reduction in diamond requirements can be readily seen from the following Table III.

Surface Finish, and Wheel Life were actually measured at Stations 1, 2, 3, 5, 7, 8, 10 and 12. The data for Stations 4, 6, 9 and 11 were interpolated and those for Stations 13 and 14 were extrapolated. The surprisingly

TABLE III

*Typical plate glass grinding with diamonds*

| Station No. | Grit size | Diamond concentration in carats/in.³ | Optimum width of cutting face of wheel (mils) | Glass removal (mils) | Surface finish (microinches) | Wheel life | |
|---|---|---|---|---|---|---|---|
| | | | | | | Ft.² of glass/ carat | In.³ of glass/ carat |
| 1 | 50-60 | 9 | 250 | 6 | 220 | 5,200 | 3,000 |
| 2 | 50-60 | 9 | 250 | 4 | 220 | 5,200 | 3,000 |
| 3 | 50-60 | 9 | 250 | 4 | 220 | 5,200 | 3,000 |
| 4 | 70-80 | 15 | | 3 | 140-170 | 6,900 | 3,000 |
| 5 | 100-120 | 20 | 160 | 2 | 90-110 | 10,400 | 3,000 |
| 6 | 120-140 | 16 | | 1.5 | 70-90 | 13,300 | 3,000 |
| 7 | 140-170 | 12 | | 1.3 | 60-70 | 16,800 | 3,000 |
| 8 | 200-230 | 9 | 280 | 1.0 | 40-50 | 20,800 | 3,000 |
| 9 | 270-325 | 5 | | 0.75 | 25-35 | 29,700 | 3,000 |
| 10 | 500 | 1 | 400 | 0.5 | 12-20 | 41,600 | 3,000 |
| 11 | 850 | 0.6 | | 0.25 | 8-12 | 83,300 | 3,000 |
| 12 | 1,050 | 0.2 | | 0.2 | 6-8 | 104,000 | 3,000 |
| 13 | 1,250 | 0.1 | | 0.15 | 4-6 | 139,000 | 3,000 |
| 14 | 2,500 | 0.05 | | 0.1 | 2-3 | 208,000 | 3,000 |
| | | | | 24.75 | | | |

In the tests of Table III a 3 inch outer diameter cup wheel was used (actually 2⅞ inch outer diameter of the grinding surface). Two inches by 18 inch glass specimens were moved reversibly in the long direction at a feed speed of 200 inches per minute. Coolant concentration and flow rate were maintained constant during the periods of the tests.

In each case new polished plate glass was used for a test. However, it is believed that late station grinding of glass previously ground with coarser grit diamonds would generally afford longer wheel life, require less spindle power, and give operation with less tendency to glass breakage; thus all wheel life figures in Table III for the late stations must be considered conservative.

As regards the data presented in Table III, the data given for Optimum Width of Cutting Face of Wheel, Surface Finish, and Wheel Life were actually measured at Stations 1, 2, 3, 5, 7, 8, 10 and 12. The data for Stations 4, 6, 9 and 11 were interpolated and those for Stations 13 and 14 were extrapolated. The surprisingly low diamond concentrations of the Station 10 and 12 data were particularly interesting.

Diamond grinding in accordance with this exemplary embodiment of the invention, as shown in Table III, requires typically ten stages to replace the conventional twenty-eight sand grinding stages. Diamond grinding stages Nos. 11 to 14 replace on the order of two-thirds of the conventional iron oxide or rouge polishing stages; about fifteen additional rouge stages in accordance with conventional methods for final polishing of plate glass are sufficient after the fourteen diamond grinding stages.

The considerable reduction in diamond requirements for the wheels of the late stations is readily apparent from the data of Table III, the wheels of late Stations 10-14 having optimum diamond concentrations of from only 1 carat per cubic inch of matrix down to as low

TABLE IV

*Effect of varying diamond concentration on wheel performance*

[All tests at table speed of 200" per minute. 3" outer diameter cup wheels used]

| Grit size | Diamond concentration (carats/cu. in. of matrix) | Wheel life (cu. in. of glass/ carat) | Net spindle power (watts) | Average surface finish (microinches) | Glass breakage (⅛" thick glass), percent | Sequence of tests | Preferred diamond concentration range |
|---|---|---|---|---|---|---|---|
| 50-60 [1] | 6 | 680 | 500 | 310 | 0 | | |
| 50-60 | 7.5 | 2,090 | 707 | 229 | 0 | | |
| 50-60 | 9 | 2,561 | 723 | 230 | 0 | | 7.5 to 18. |
| 50-60 | 18 | 2,624 | 1,150 | 162 | 40 | | |
| 50-60 | 36 | | | | 100 | | |
| 100-120 [2] | 9 | 1,545 | 328 | 143 | 0 | | |
| 100-120 | 20 | 3,551 | 410 | 108 | 0 | | |
| 100-120 | 40 | 2,996 | 640 | 85 | 0 | | 15 to 60. |
| 100-120 | 60 | 2,670 | 490 | 80 | 30 | | |
| 200-230 | 3 | 1,067 | 197 | 74.2 | 0 | 2 | |
| 200-230 | 6 | 2,324 | 268 | 55.8 | 0 | 2 | |
| 200-230 | 9 | 2,593 | 320 | 47.8 | 0 | 2 | |
| 200-230 | 30 | 1,250 | 520 | 42 | 0 | 1 | 5 to 50. |
| 200-230 | 50 | 1,323 | 600 | 42 | 7 | 1 | |
| 200-230 | 70 | 777 | 630 | 39 | 8 | 1 | |
| 500 | 0.5 | 2,388 | 370 | 20 | 0 | 3 | |
| 500 | 1 | 2,678 | 450 | 21 | 0 | 3 | |
| 500 [4] | 1.5 | 3,900 | 503 | 18 | 0 | 3 | |
| 500 | 3 | 3,216 | 570 | 18 | 0 | 3 | |
| 500 | 6 | 1,403 | 725 | 21 | 0 | 3 | |
| 500 | 9 | 1,041 | 854 | 25 | 20 | 2 | .5 to 9. |
| 500 | 20 | 621 | 768 | 29 | 40 | 1 | |
| 500 | 40 | 68 | 1,250 | 33 | 100 | 1 | |
| 500 | 60 | 2 | Excessive | | 100 | 1 | |
| 1,050 [5] | .25 | 4,035 | 480 | 10 | 0 | | |
| 1,050 | .5 | 733 | 360 | 9 | 0 | | .05 to 3. |
| 1,050 | 1.5 | 434 | 560 | 8 | 0 | | |

[1] Downfeed—.004" per table reversal.  Coolant conc.—50:1.
[2] Downfeed—.002" per table reversal.  Coolant conc.—25:1.
[3] Downfeed—.001" per table reversal.  Coolant conc.—25:1.
[4] Downfeed—.0005" per table reversal.  Coolant conc.—25:1. Diamonds in 30 to 50μ size range.
[5] Downfeed—.0002" per table reversal. Coolant conc.—25:1. Diamonds in 8 to 25μ size range.

as .05 carat per cubic inch of matrix as contrasted with the wheels of initial Stations 1–3 and additional successive Stations 4–7 having a considerably higher diamond concentration. Concentrations of diamonds as low as .05 carat per cubic inch and even lower can be used with satisfactory results in the wheels of the late stations in accordance with this invention.

The conclusions regarding preferred diamond concentrations embodied in the Table III programming resulted in considerable part from experiments showing superior wheel performance at the specified diamond concentrations than found at higher or lower concentrations. In general, favorable grinding performance under each condition was found for a particular range of diamond concentrations, with less satisfactory performance outside of these preferred ranges. The basis for choice of such ranges is shown in Table IV, which contains results for 50–60 grit size diamonds used for Stations 2 or 3, for 100–120 grit size diamonds used for Station 5, for 200–230 grit size diamonds used for Station 8, for 500 grit size diamonds used for Station 10, and for 1050 grit size diamonds used for Station 12.

The Table IV data shows a relatively narrow preferred diamond concentration range for 50–60 grit diamonds of 7.5 to 18 and somewhat broader satisfactory concentration results for additional grinding with smaller sized grits. Thus, for 100–120 grit size satisfactory grinding took place at 15 to 60 diamond concentration but not at 9 diamond concentration, for 200–230 grit size satisfactory grinding took place at 5 to 50 diamond concentration but not at 70 diamond concentration, and for 500 grit size favorable grinding took place at .5 to 9 concentration, unsatisfactory grinding at 20 concentration, and extremely bad operation at 40 and 60 concentration. For 1050 grit size, favorable grinding took place at the remarkably low diamond concentration of .05 to 3 carats per cubic inch.

For the 200–230 grit size and 500 grit size diamonds the sequence in which the tests were run is given. The order of the experiments shows how completely unexpected were the superior wheel performance results with low diamond concentrations at the late stations. With any particular size grit the type of diamonds and wheel construction methods were kept identical for all diamond concentrations, so that for each size the results for different concentrations are completely comparable.

It will be understood that grinding of glass as delivered from the melting furnace and rollers is referred to in the data shown in Tables III and IV. In general, the number of stages necessary for grinding of any material depends on the initial roughness of its surface. For the material with smoother surface than glass from the melting furnace, the initial stages described in Table III will be unnecessary and may be omitted. For example, if it is desired to convert sheet glass to plate glass by a glass removal of 5 to 10 mils (rather than approximately 25 mils as used according to Table III), the first 4 or 5 stations of Table III may be omitted and glass with a surface finish of 2 to 3 microinches may be obtained by following the teachings of this table regarding the other stations.

The ranges in the preferred number of diamonds on the cutting surface as has been discussed apply for any annular width of the grinding surface on the wheel, for example, a width of 1/16" to 12", provided essentially all of the circumference of the wheel contains a diamond grinding surface.

Special large diameter wheels, for example, 12 feet in diameter, with greater widths of the grinding surface, can be made in accordance with the principles of the invention. Thus, segments may be made about 3" wide, for instance to increase their strength. They can have a proper number of diamond particles in their leading and trailing edges as a result of suitable concentration, for example, in 1/32" wide grinding strips at these edges.

Referring again to FIG. 1, from the diamond grinding stages, the plate glass sheet is then advanced to iron oxide or rouge "polishing stations," where it is polished in conventional and known manner. The polishing heads at the polishing stations also have vertical spindles and iron oxide or rouge is employed as an abrasive. By virtue of the present invention, the number of iron oxide polishing stations required is reduced or lowered considerably as contrasted to the 42 polishing stations previously required.

After completion of the grinding and polishing of one side of the plate glass, the plate glass is reversed or turned over, blocked and passed through the second side diamond grinding stations and iron oxide polishing stations, also shown in FIG. 1, and similar in structure and number as those employed for grinding and polishing the first side. The grinding and polishing of both sides of the plate glass sheets are then completed.

As pointed out in my earlier applications basic variables involved in glass grinding with diamond grinding wheels include the rate of feed conveyor speed for the plate glass sheet being ground, and the rate of rotation of the diamond grinding wheel. The conveyor speed or rate of feed of the glass is normally given in terms of inches per minute. Conveyor speeds of 200 inches per minute and higher are practical in the present invention. However, lower speeds of about 175 inches per minute and lower can also be employed. The rate of rotation of the diamond grinding wheel in terms of revolutions per minute is not particularly significant, as the rate or speed at which the grinding surface engages the plate glass is also dependent on the radius of the wheel. With the diamond grinding surface being concentrated near the outer periphery of the grinding wheel, a more useful value is the rate at which the diamond grinding surface passes over and engages the plate glass, in terms of surface feet per minute. This is equal to the circumference of the wheel multiplied by the number of revolutions per unit time of the wheel. Thus, with a wheel having a diameter of about 10 feet, the rate of rotation is about 90 to 95 revolutions per minute in order to produce a relative velocity between the glass and the diamond grinding surface of about 2800 or 3000 surface feet per minute. The stress produced in the glass during the grinding is also a factor of importance, inasmuch as chipping or breakage of glass resulting from high stresses cannot be tolerated to any significant extent. High stresses are produced in the glass with attendant glass chipping or breakage by use of excessively high diamond concentrations when large amounts of stock are to be removed at initial stations in the grinding process. Use of diamond particle sizes which are too large also results in chipping or breakage of the glass. Further, use of lean coolant concentrations are accompanied by an increase in the grinding stresses. The spindle power which is absorbed is indicative of the stress, and the likelihood of glass chipping or breakage.

The diamond grinding wheels of this invention can have a circular or generally circular wheel support as large as 2 feet, 12 feet, or larger diameter.

There appears to be at all the stages in the diamond grinding of plate glass an optimum pressure for each diamond particle, decreasing with decrease in the average diamond particle size.

The preferred number of diamonds and diamond concentration will vary somewhat depending on the pressure applied in the grinding. Thus a somewhat higher spindle power is acceptable resulting from a higher concentration of diamonds, for example, when relatively thick glass is used.

Maintaining the preferred number of diamonds per circumferential inch of the leading and trailing edges and the preferred concentration of diamonds is fundamental to applications of the invention to new conditions. Preferred numbers of diamonds have been stated for each grit size for both the 3 inch diameter wheel applied to 2 inch width glass strips and for the 30 inch diameter wheel applied to 20 inch width glass strips. To design, for example, 12 foot diameter wheels for grinding 10 foot width continuous glass, the same principles would be used. The number of diamond particles in the 12 foot diameter wheels would be increased relative to the 30 inch diameter wheels, for example, so that for a given diamond grit size the pressure per diamond particle at the leading edge, the pressure per diamond particle at the trailing edge, and the pressure per diamond particle at the cutting surface is held constant.

The term "diamonds" or "diamond" is used herein in a broad sense to include both natural diamonds and synthetic diamonds having the approximate hardness or other abrasive qualities of natural diamonds. Diamond concentrations have been given in carats per cubic inch, with the carat, which is equal to one-fifth of a gram, being the usual unit of diamond weight. With other abrasives which are not of gem quality, it is regarded as suitable to express concentrations as grams per cubic inch.

In honing surfaces and/or edges of materials in accordance with the principles of this invention, the surfaces and/or edge of the material is ground with a grinding wheel having a low concentration of hard abrasive grits bonded in the grinding surface of the wheel matrix. The abrasive grits are those characterized by having a hardness of 8 or higher, preferably 12 or higher on the Extension of Mohs' Scale. Preferred among these hard abrasives are diamonds. The materials which can be honed include metals, for instance, ferrous metals, e.g. iron and steels, stone, glass, ceramics, and cemented carbides. The edges of these materials which can be honed include the edges immediately adjacent and defining holes or orifices. When using a grinding wheel for the honing having diamond grits bonded in the wheel matrix, low concentrations of diamonds of less than 2 carats per cubic inch of matrix can be used. By the term "honing" used herein is meant converting a non-smooth or irregular surface or edge into a smooth even surface or edge, substantially free of irregularities. "Honing" includes the sharpening of edges of materials, for instance the edges of metallic objects, e.g. ferrous metal cutting blades.

It will be obvious to those skilled in the art that the above described embodiments are merely exemplary and that the present invention is susceptible of modification and variation without departing from the spirit and scope thereof. Therefore, the invention is not deemed to be limited, except as defined by the appended claims.

I claim:

1. Apparatus for producing a predetermined flat surface on articles formed of a hard material in a sequential surfacing operation, comprising a plurality of grinding stations including respective rotary grinding wheels with a flat annular grinding face having abrasive diamond particles bonded therein of respective particle size and concentration adapted to overlie and be in substantially coplanar relation to the intended flat surface of the articles being surfaced, means for controlling the relative position of the articles being surfaced in each of said grinding stations to effect controlled surfacing thereof, means for controlling the down-feed of said annular grinding face of said grinding wheels in each of said stations upon the surface of the articles to produce respective predetermined material removal without application of undue stress to the articles being surfaced, and means for supplying at each of said stations a coolant for intromissive flow intermediate said respective annular grinding face and the surface of the articles, the respective particle sizes and concentrations of said abrasive diamond particles in said grinding wheels at different successive ones of said plurality of grinding stations being in progressively decreasing relation.

2. Apparatus as claimed in claim 1, wherein the respective concentrations of diamond particles in the different successive grinding stations are no greater than 20 carats per cubic inch.

3. Apparatus as claimed in claim 1, wherein the respective diamond particle sizes at the different successive grinding stations are no greater than 50–60 grit size.

4. Apparatus as claimed in claim 1, wherein the diamond particles at a first one of said plurality of stations are of a particle size in the order of 200–230 grit and are in a concentration no greater than 9 carats per cubic inch, and the diamond particles at one or more successive stations are of a particle size progressively smaller than the particles at said first station and are in concentrations of materially lesser magnitude than and in progressively decreasing relation to the particles at said first station.

5. Apparatus for producing a predetermined flat surface on articles formed of a hard material in a sequential surfacing operation, comprising a plurality of grinding stations including respective rotary grinding wheels with a flat annular grinding face having abrasive diamond particles bonded therein of respective particle size and concentration adapted to overlie and be in substantially coplanar relation to the intended flat surface of the articles being surfaced, means for controlling the relative position of the articles being surfaced in each of said grinding stations to effect controlled surfacing thereof, means for controlling the down-feed of said annular grinding face of said grinding wheels in each of said stations upon the surface of the articles to produce respective predetermined material removal without application of undue stress to the articles being surfaced, and means for supplying at each of said stations a coolant for intromissive flow intermediate said respective annular grinding face and the surface of the articles, the respective particle sizes of said abrasive diamond particles in said grinding wheels at different successive ones of said plurality of grinding stations being in progressively decreasing relation, the concentration of said diamond particles in a first one of said grinding wheels at a first one of the grinding stations being of a given magnitude, the concentration of diamond particles in one of said grinding wheels at a second successive one of said grinding stations being of a greater magnitude, and the concentration of diamond particles in said grinding wheels at one or more different additional successive stations being in progressively decreasing relation relative to the concentration of diamond particles at said second successive station.

6. Apparatus for producing a predetermined flat surface on articles formed of a hard material in a continuous sequential surfacing operation, comprising a plurality of grinding stations arranged in a surfacing line including respective rotary grinding wheels with a flat annular grinding face having abrasive diamond particles bonded therein of respective particle size and concentration adapted to overlie and be in substantially coplanar relation to the intended flat surface of the articles being surfaced, means for feeding the article being surfaced through each of said grinding stations at a controlled rate to effect controlled surfacing thereof, means for controlling the down-feed of said annular grinding face of said grinding wheels in each of said stations upon the surface of the articles passing therethrough to produce respective predetermined material removal without application of undue stress to the articles being surfaced, and means for supplying at each of said stations a coolant for intromissive flow intermediate said respective annular grinding face and the surface of the articles, the respective particle sizes and concentrations of said abrasive diamond particles in said grinding wheels at different successive ones of said plurality of grinding stations being in progressively decreasing relation.

7. Apparatus for producing a predetermined flat surface on the principal surfaces of flat sheets of glass and the like in a continuous sequential surfacing operation, comprising a plurality of grinding stations arranged in a surfacing line including respective rotary grinding wheels with a flat annular grinding face having abrasive diamond particles bonded therein of respective particle size and concentration adapted to overlie and be in substantially coplanar relation to the principal surfaces of the flat sheets, means for feeding the flat sheets at a predetermined rate successively through each of said grinding stations to effect controlled surfacing thereof, means for controlling the down-feed of said annular grinding face of said grinding wheels in each of said stations upon the principal surface of the sheet passing therethrough to produce respective predetermined glass removal without application of undue stress to the sheet being surfaced, and means for supplying at each of said stations a coolant for intromissive flow intermediate said respective annular grinding face and the principal surface of the sheet, the respective particle sizes and concentrations of said abrasive diamond particles in said grinding wheels at different successive ones of said plurality of grinding stations being in progressively decreasing relation.

8. Apparatus for producing a predetermined flat surface on the principal surfaces of flat sheets of glass and the like in a continuous sequential surfacing operation, comprising a plurality of grinding stations arranged in a surfacing line including respective rotary grinding wheels with a flat annular grinding face having abrasive diamond particles bonded therein of respective particle size and concentration adapted to overlie and be in substantially coplanar relation to the principal surfaces of the flat sheets, means for feeding the flat sheets at a predetermined rate successively through each of said grinding stations to effect controlled surfacing thereof, means for controlling the down-feed of said annular grinding face of said grinding wheels in each of said stations upon the principal surface of the sheet passing therethrough to produce respective predetermined glass removal without application of undue stress to the sheet being surfaced, and means for supplying at each of said stations a coolant for intromissive flow intermediate said respective annular grinding face and the principal surface of the sheet, said abrasive diamond particles in one of said grinding wheels at a first one of said grinding stations being in the order of a given particle size and a given concentration, said abrasive diamond particles in one of said grinding wheels at a second successive one of said grinding stations being of lesser particle size than said given particle size and of a concentration materially higher than said given concentration, the respective particle sizes and concentrations of said abrasive diamond particles in said grinding wheels at one or more different successive ones of said plurality of grinding stations following said second station being in progressively decreasing relation and of lesser size and concentration than said particles at said second station.

References Cited by the Examiner

UNITED STATES PATENTS

| | | | |
|---|---|---|---|
| 2,578,789 | 12/1951 | Donnelly | 51—110 |
| 2,673,425 | 3/1954 | Karnell | 51—209 |
| 2,705,853 | 4/1955 | Laverdisse | 51—112 |
| 2,828,197 | 3/1958 | Blackmer | 51—309 |
| 2,867,059 | 1/1959 | Charnock | 51—112 |
| 2,921,419 | 1/1960 | Torway | 51—283 |
| 2,937,480 | 5/1960 | Peyches | 51—283 |
| 2,942,387 | 6/1960 | Linblad | 51—209 |
| 2,947,617 | 8/1960 | Wentorf | 51—298 X |
| 2,985,989 | 5/1961 | Knost | 51—283 X |
| 3,007,288 | 11/1961 | Brewin | 51—110 |

ROBERT C. RIORDON, *Primary Examiner.*